3,281,342
METHOD OF DYEING ALUMINUM BLACK
Charles C. Cohn, Atlantic City, N.J., assignor to Samuel L. Cohn and Charles C. Cohn, copartners trading and doing business as Colonial Alloys Company, Philadelphia, Pa.
No Drawing. Filed July 12, 1962, Ser. No. 209,316
2 Claims. (Cl. 204—35)

This invention relates to the dyeing of oxide coatings on aluminum, which term is used herein to include those alloys of aluminum containing a high percentage of aluminum on which oxide coatings may be produced in conventional fashions either chemically or electrolytically. More particularly, the invention relates to the dyeing of anodized aluminum surfaces wherein an oxide coating is first formed by standard and well known anodizing procedures. For example, such procedures commonly utilize the passage of a D.C. current of twelve amperes per square foot of surface area for at least thirty to seventy minutes through a sulfuric acid bath having a concentration in the order of 15% by weight at a temperature of approximately 70° F.

Under this procedure, it is necessary to continue the anodizing process for at least thirty minutes in order to create a sufficiently thick coating to adsorb enough dye so as to result in a deep and uniform color when the coating is subsequently dyed, the term "thick" referring to coatings in the order of 0.0008 inch. This long period of anodizing is highly objectionable for a number of reasons. First, it is objectionable from a commercially economic standpoint since it slows down the entire manufacturing process. More importantly however, such thick coatings dull the appearance of the aluminum and tend to be of non-uniform hardness, being too brittle near the surface of the aluminum and being too soft at the outer surface of the coating. This softness is caused by the electrolyte which attacks the coating during the anodizing period and the degree of softness is proportional to the length of the period as well as the temperature of the electrolyte. Thus, in order to avoid such softening and the resultant smutting, it was previously necessary to maintain the temperature relatively low, for example, at approximately 70° F.

In brief, the present invention is based upon the discovery of the fact that, if certain dyes are selected and used in a particular combination, the oxide coating may be reduced in thickness to substantially one-half of the thickness previously required which, in turn, results in overcoming all of the above mentioned objectionable features of the previously required thick oxide coat. That is, the time of anodizing is cut substantially in half and the temperature may be raised considerably so that the much thinner coating is of more uniform hardness and does not have such a marked tendency to smut. In addition, the much thinner coat does not dull the appearance of the aluminum surface so that buffing is eliminated. Even more importantly, the subsequent dyeing process produces a more pure and deeper color than has been previously possible as will be more fully explained hereinafter. Thus, the general objects of the invention are to secure the above mentioned advantages as well as others which will become more fully apparent from the following description.

Heretofore, considerable difficulty has been experienced in obtaining deep black coloring of aluminum oxide coatings and, in order to obtain deeper black colors, attempts have been made to use yellow or orange dyes in combination with the black dye. The use of such auxiliary dyes has been partially successful insofar as jetting the black toward the true black from the gray-black which results when such auxiliary dyes are not employed. However, the use of these auxiliary dyes is objectionable in that they tend to produce green or red tinting of the black. That is, the black has overtones of red or green depending upon whether orange or yellow dyes are used in combination with the black dye. However, contrary to the results which would be expected from the foregoing known art, it has been discovered that the use of certain dyestuffs in combination results in the production of a pure black coloring which is so black that it has no green or red overtones visible to the eye.

These dyestuffs are the black dye identified by Colour Index Number 20470 and the orange dye identified by Colour Index Number 15510, although the theory as to why these particular dyestuffs produce the above mentioned results is not known. Hence, as is the case throughout the entire dyeing art, only the ingredients and the conditions of their use, together with the observed results, can be described.

With regard to the conditions for practicing the present invention, it has been found that the black to orange dye ratio should be approximately 3:1 (by weight) although this ratio is obviously dependent upon the concentrations of the respective dyes. For example, the above ratio produces exceptionally deep and pure blacks with a dye concentration of between 8.0 g./l. and 0.25 g./l., whereas, lower concentrations tend to produce a purple tinting. Similarly, good results may be obtained with a dye concentration of 8.0 g./l. so long as the black to orange dye ratios are between 3:1 and 1:1 (by weight). However, below the 1:1 ratio (by weight), the resultant dyed surface tends to have an orange tinting which becomes quite pronounced, for example, at a ratio (by weight) beyond 1:2. In practicing the invention the pH of the dye solution should be between 3 and 6, however, better results may be obtained by using a pH of between 4 and 5 with the optimum results occurring with a pH of approximately 4.8.

With regard to the temperature of the dyeing solution, extremely wide variations are possible depending upon the duration of this step. For example, excellent dyeings may be obtained with a bath temperature of approximately 140° F. when the dyeing step is carried on for approximately 10 minutes. However, good dyeings may also be produced using bath temperatures between 70° F. and the boiling point of the dye solution which is approximately 212° F. if the duration of the bath is varied inversely as the temperature rises.

As pointed out hereinabove, the use of these particular dyestuffs in combination permits the anodized coating to be reduced substantially one-half in thickness from that which was previously required. Although the exact reason is not accurately known, it is clear that, when these particular dyestuffs are employed in combination, their absorption by the oxide coating is greatly increased. Thus, the oxide coating may be reduced substantially in thickness which reduces the time of anodizing to approximately 15 to 20 minutes versus the 30 to 70 minute period previously required to build up the much thicker oxide coating. In turn, the much thinner coating does not dull the metallic surface and is substantially more uniform in hardness so that the exterior surface does not have the marked tendency to smut. This also results in eliminating the need for wiping and/or buffing which also reduces the time required for the manufacturing process. Thus, the present invention achieves all of the objects set forth hereinabove in addition to producing a much more pure black coloring than has been previously obtainable.

It is to be understood that the invention is not to be limited otherwise than as specifically set forth in the following claims.

What is claimed is:

1. The method of producing a pure black coating on an aluminum surface comprising the steps of forming a thin aluminum oxide coating on the surface and then applying to the coating a dyeing solution containing as its essential constituents the black dye identified by Colour Index Number 20470 and the orange dye identified by Colour Index Number 15510, the weight ratio of the black dye to the orange dye in said solution being approximately in the range 3:1 to 1:1.

2. The method of claim 1 in which the oxide coating is formed by sulphuric acid anodizing of the aluminum surface for a period in the range of about 15 to 30 minutes.

References Cited by the Examiner

UNITED STATES PATENTS

| | | | |
|---|---|---|---|
| 2,393,640 | 1/1946 | King | 148—6.1 |
| 2,960,420 | 11/1960 | Mitchell | 148—6.1 |
| 3,077,425 | 2/1963 | Fromson | 148—6.1 |

OTHER REFERENCES

Darrin et al., Metal Finishing, September 1943, 41: 550-2, T S200M 587.

Colour Index, second edition, The Society of Dyers and Colourists, 1956 TP 910 S6, pp. 1056 and 1375 relied on.

Colour Index (2nd ed.), vol. 1, pp. 1375-6 (1956).

JOHN H. MACK, *Primary Examiner.*

MURRAY TILLMAN, L. G. WISE, W. VAN SISE,
*Assistant Examiners.*